United States Patent [19]

Mayer et al.

[11] Patent Number: 4,935,059
[45] Date of Patent: Jun. 19, 1990

[54] BASIC RHODAMINE DYES

[75] Inventors: Udo Mayer, Frankenthal; Andreas Oberlinner, Ludwigshafen, both of Fed. Rep. of Germany

[73] Assignee: BASF Aktiengesellschaft, Ludwigshafen, Fed. Rep. of Germany

[21] Appl. No.: 366,450

[22] Filed: Jun. 15, 1989

[30] Foreign Application Priority Data

Jun. 23, 1988 [DE] Fed. Rep. of Germany ....... 3821196

[51] Int. Cl.$^5$ .................... C09D 11/02; C07D 311/82
[52] U.S. Cl. ...................................... 106/22; 549/227; 549/394; 548/525; 546/196; 544/150; 544/375
[58] Field of Search ................. 106/22; 549/227, 394; 548/525; 546/196; 544/150, 375

[56] References Cited

U.S. PATENT DOCUMENTS

| | | | |
|---|---|---|---|
| 3,849,065 | 11/1974 | Schmeidl | 549/227 |
| 4,106,027 | 8/1978 | Hoffmann et al. | 106/22 |
| 4,165,399 | 8/1979 | Germonprez | 106/22 |
| 4,248,636 | 2/1981 | Sasaki et al. | 106/22 |
| 4,603,202 | 7/1986 | Mayer et al. | 544/150 |
| 4,647,675 | 3/1987 | Mayer et al. | 549/394 |
| 4,750,935 | 6/1988 | Prochaska et al. | 106/22 |

FOREIGN PATENT DOCUMENTS 167998 1/1986 European Pat. Off. .

Primary Examiner—Paul Lieberman
Assistant Examiner—Helene Klemanski
Attorney, Agent, or Firm—Oblon, Spivak, McClelland, Maier & Neustadt

[57] ABSTRACT

Basic rhodamine dyes suitable for use in recording fluids for the ink jet process and for coloring paper stock have the formula

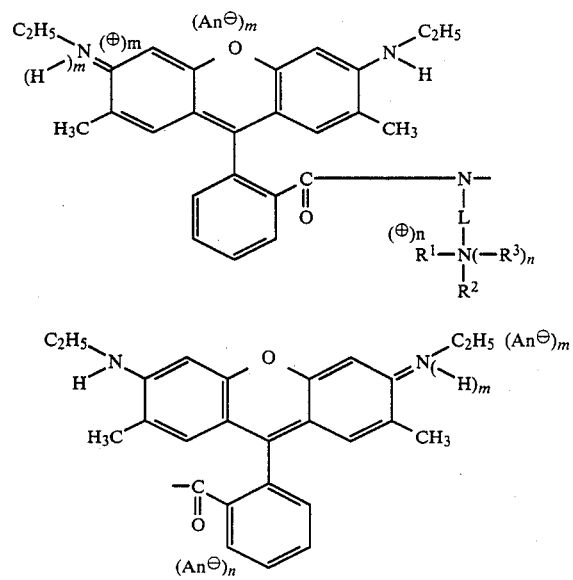

where
L is $C_2$–$C_{10}$-alkylene,
$R^1$, $R^2$ and $R^3$ are each independently of the others hydrogen, substituted or unsubstituted $C_1$–$C_{10}$-alkyl or $C_5$–$C_7$-cycloalkyl or $R^1$ and $R^2$ together with the nitrogen atom linking them together are a hetero cyclic radical,
An$^\ominus$ is one equivalent of an anion and m and n are each independently of the other 0 to 1.

4 Claims, No Drawings

BASIC RHODAMINE DYES

The present invention relates to basic rhodamine dyes of the formula I

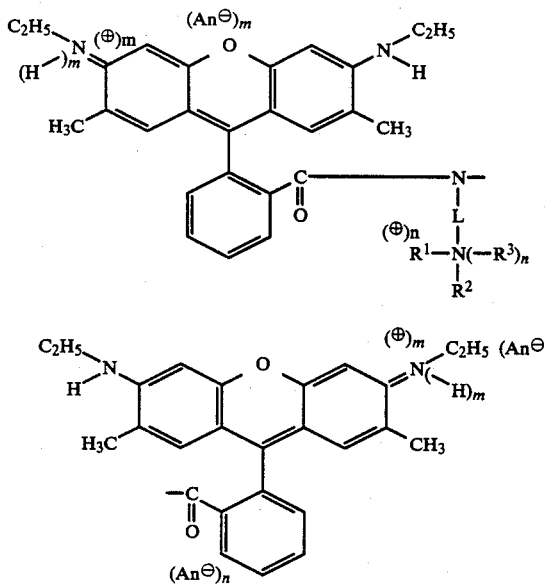

where

L is $C_2$–$C_{10}$-alkylene, $R^1$, $R^2$ and $R^3$ are identical or different and each is independently of the others hydrogen, substituted or unsubstituted $C_1$–$C_{10}$-alkyl or $C_5$–$C_7$-cycloalkyl, or $R_1$ and $R_2$ together with the nitrogen atom linking them together are pyrrolidino, piperidino, morpholino, piperazino or N-($C_1$–$C_4$-alkyl)piperazino, $An^\ominus$ is one equivalent of an anion and m and n are identical or different and each is independently of the other 0 or 1, a recording fluid for the ink jet process containing a water-miscible solvent and a basic rhodamine dye of the formula I, and the use of the novel dyes for coloring paper stock.

EP-A-No. 167,998 already discloses rhodamine dyes having substituted carbamoyl groups. However, the dyes described there are not sufficiently soluble.

It is an object of the present invention to provide novel basic dyes on a rhodamine basis which are free of this defect.

We have found that this object is achieved by the basic rhodamine dyes of the abovementioned formula I.

All the alkyl and alkylene groups appearing in the abovementioned formula I can be not only straight-chain but also branched.

In substituted alkyl groups $R^1$, $R^2$ and $R^3$, the substituents are for example phenyl, $C_5$–$C_7$-cycloalkyl, cyano, hydroxyl or $C_1$–$C_4$-alkoxy.

Suitable radicals L are for example —(CH$_2$)$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$—, —CH(CH$_3$)—CH$_2$ and —CH(CH$_3$)—CH(CH$_3$)—.

Suitable radicals $R^1$, $R^2$ and $R^3$ are each for example methyl, ethyl, propyl, isopropyl, butyl, isobutyl, sec-butyl, pentyl, isopentyl, neopentyl, tert-pentyl, hexyl, heptyl, octyl, 2-ethylhexyl, nonyl, decyl, benzyl, 1- or 2-phenylethyl, cyclopentylmethyl, 1- or 2-cyclopentylethyl, cyclohexylmethyl, 1- or 2-cyclohexylethyl, cyanomethyl, 2-cyanoethyl, 3-cyanopropyl, 4-cyanobutyl, 2-hydroxyethyl, 2- or 3-hydroxypropyl, 2- or 4-hydroxybutyl, 2-methoxyethyl, 2-ethoxyethyl, 2-propoxyethyl, 2-butoxyethyl, 2- or 3-methoxypropyl, 2- or 3-ethoxypropyl, 2- or 4-methoxybutyl, 2- or 4-ethoxybutyl, cyclopentyl, cyclohexyl, methylcyclohexyl or cycloheptyl.

A heterocyclic radical formed by $R^1$ and $R^2$ together with the nitrogen atom joining them together can also be for example N-methylpiperazino, N-ethylpiperazino, N-propylpiperazino or N-butylpiperazino in addition to the abovementioned possibilities.

Suitable anions from which to derive the one equivalent of $An^\ominus$ are not only inorganic but also organic anions, for example chloride, bromide, iodide, sulfate, hydrogensulfate, amiosulfate, methosulfate, ethosulfate, perchlorate, methylsulfonate, benzenesulfonate, methylbenzenesulfonate, oxalate, maleate, formate, acetate, hydroxyacetate, methoxyacetate, propionate, succinimide and tartrate.

Particular preference is given to basic rhodamine dyes of the formula I where L is $C_2$–$C_4$-alkylene and $R^1$, $R^2$ and $R^3$ are each $C_1$–$C_4$-alkyl.

To prepare the basic rhodamine dyes of the formula I, it is possible for example to react a rhodamine dye of the formula II or III

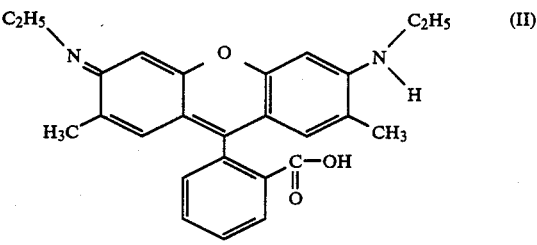

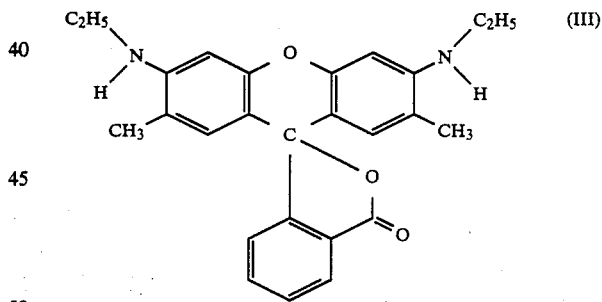

with an amine of the formula IV

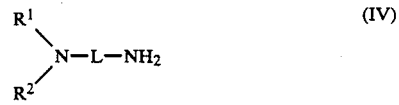

where L, $R^1$ and $R^2$ are each as defined above.

The reaction is carried out for example by first introducing the rhodamine dye and the amine in a molar ratio of from 1:1.5 to 1:2 in an inert organic solvent and then adding from 1 to 3 moles, based on the rhodamine dye, of an acid halide. This is advantageously followed by heating at from 80° to 130° C. for from 2 to 12 hours. After the reaction has ended, the solvent is removed, for example by addition of water and azeotropic distillation of the particular solvent. Dilute alkali, for example sodium hydroxide solution, is then added to precipitate the target product, which can then be separated off.

Suitable organic solvents are for example, toluene, xylene, chlorobenzene, dichlorobenzene, chloroform, 1,2-dichloroethane and trichloroethane.

Suitable acid halides, in particular acid chlorides, are for example phosphorus trichloride, phosphoryl trichloride and phosphorus pentachloride.

By acidification with an acid (for example $An^{\ominus}$) or by alkylation (for example with dimethyl sulfate or diethyl sulfate) in a conventional manner it is then possible to obtain those rhodamine dyes of the formula I where m and/or n are each 1.

The present invention further provides a recording fluid for the ink jet process, containing a water-miscible organic solvent and a basic rhodamine dye of the formula I.

Water-miscible organic solvents are for example $C_1-C_4$-alkanols, such as methanol, ethanol, propanol, isopropanol, butanol, isobutanol, sec-butanol or tert-butanol, carboxamides, such as N,N-dimethylformamide or N,N-dimethylacetamide, lactams, such as N-methylpyrrolidin-2-one, cyclic ureas, such as 1,3-dimethylimidazolidin-2-one, ketones or ketoalcohols, such as acetone, methyl ethyl ketone or 2-methyl-2-hydroxypentan-4-one, ethers, such as tetrahydrofuran or dioxane, mono-, di- or polyalkylene glycols or thioglycols having $C_2-C_6$-alkylene units, such as ethylene glycol, 1,2- or 1,3-propylene glycol, 1,2- or 1,4-butylene glycol, 1,6-hexylene glycol, diethylene glycol, triethylene glycol, thiodiglycol, polyethylene glycol or polypropylene glycol, other polyols, such as glycerol or hexane-1,2,6-triol, $C_1-C_4$-alkyl ethers of polyhydric alcohols, such as ethylene glycol monomethyl or monoethyl ether, diethylene glycol monomethyl or monoethyl ether or triethylene glycol monomethyl or monoethyl ether, and dimethyl sulfoxide.

Preferred water-miscible organic solvents are for example N-methylpyrrolidin-2-one, mono-, di- or trialkylene glycols having $C_2-C_6$-alkylene units, in particular mono-, di- or triethylene glycol, and dimethyl sulfoxide. Very particular preference is given to N-methylpyrrolidin-2-one, diethylene glycol and dimethyl sulfoxide.

The proportion of dye of the formula I is from 2 to 10% by weight, preferably from 3 to 5% by weight, based on the total weight of the recording fluid.

Preference is given to a recording fluid which besides the dye of the formula I and a water-miscible organic solvent additionally contains water.

In this case, the recording fluid according to the invention for the ink jet process contains in general from 50 to 95% by weight, in particular from 70 to 90% by weight, based on the total weight of the solvent system, of water.

The novel recording fluid may contain further assistants, for example agents for affecting the viscosity, such as polyvinyl chloride or cellulose derivatives, surfactants (nonionic, anionic or cationic) or buffer systems.

The dyes of the formula I according to the invention are further suitable in particular for coloring paper stock, but also for dyeing anionically modified fibers, for producing print pastes or printing inks, and for dyeing leather and coloring plastics. They can also be used to color bleached (wood-free or low-wood) celluloses in brilliant red shades. The bath exhaustion is high. Especially the high solubility of the novel rhodamine dyes is noteworthy.

The following Examples will illustrate the invention in more detail:

EXAMPLE 1

103 g of the color base of the formula

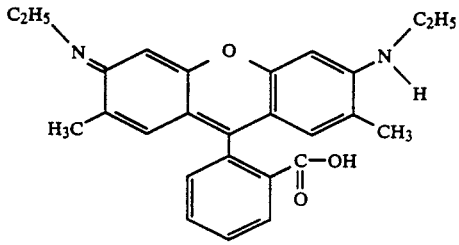

and 25 g of 3-dimethylaminopropylamine were introduced into 260 g of o-dichlorobenzene. To the mixture were added 61 g of phosphoryl trichloride, and the resulting mixture was then maintained at 120° C. for 6 hours. The batch was hydrolyzed with a solution of 22 g of sodium hydroxide in 200 ml of water and freed from o-dichlorobenzene by steam distillation. The dye suspension was then diluted with 450 ml of water and brought to pH 8.5 with sodium hydroxide solution. The precipitated product was filtered off with suction, washed with water and dried, leaving 130 g of dye of the formula

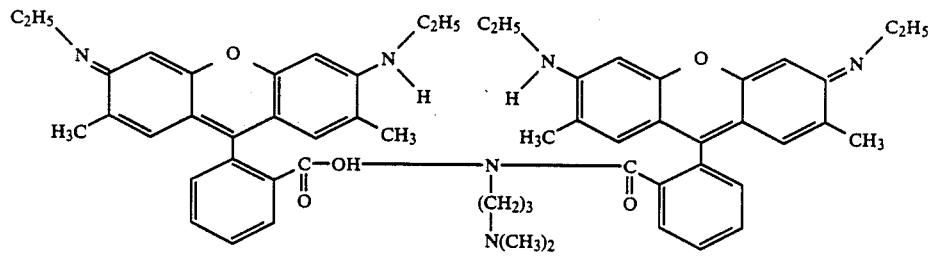

($\lambda_{max}$: 534 nm).

The dye colors paper fibers in brilliant red shades. Even in the dyeing of wood-free papers exhaustion of the dyebath was virtually complete.

A 3% strength by weight solution of the dye in a mixture of 7 parts by volume of water, 2 parts by volume of diethylene glycol and 1 part by volume of N-methylpyrolidin-2-one on application by the ink jet process gave prints of good rub and water fastness.

The method of Example 1 was also used to obtain the dyes of the formula

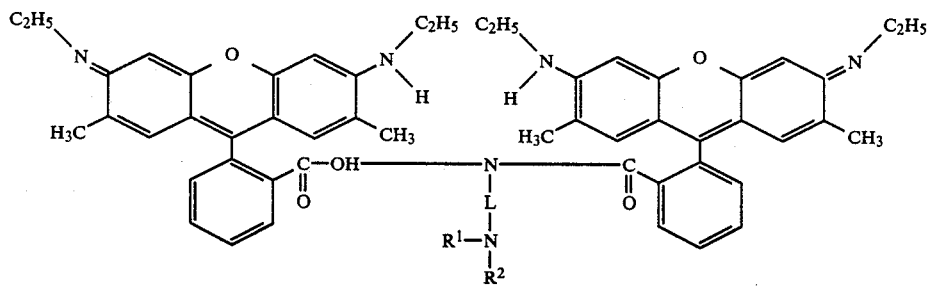

listed in the Table below.

| Example No. | L | $-N\begin{matrix}R^1\\R^2\end{matrix}$ |
|---|---|---|
| 2 | $C_2H_4$ | $N(CH_3)_2$ |
| 3 | $C_2H_4$ | $N(C_2H_5)_2$ |
| 4 | $C_3H_6$ | $N(C_2H_5)_2$ |
| 5 | $C_3H_6$ | $NH-CH_3$ |
| 6 | $C_3H_6$ | NH—cyclohexyl |
| 7 | $CH(CH_3)C_3H_6$ | $N(C_2H_5)_2$ |
| 8 | $C_2H_4$ | N-methylpiperazino |

EXAMPLE 9

5 g of the dye prepared in Example 1 were dissolved in 50 g of 1,2-dichloroethane and methylated with 2 g of dimethyl sulfate at 50° C. After a reaction time of 6 hours, 5 g of 25% strength by weight ammonia solution were added to decompose excess dimethyl sulfate. The mixture was then cooled down to 25° C., and the precipitate was filtered off with suction and washed with a little dichloroethane. Drying left 4 g of a dye of the formula

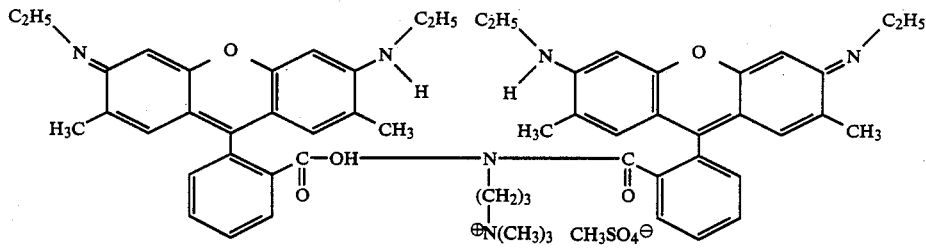

We claim:
1. A basic rhodamine dye of the formula I where
L is $C_2-C_{10}$-alkylene,
$R^1$, $R^2$ and $R^3$ are identical or different and each is independently of the others hydrogen, substituted or unsubstituted $C_1-C_{10}$-alkyl or $C_5-C_7$-cycloalkyl, or $R_1$ and $R_2$ together with the nitrogen atom linking them together are pyrrolidino, piperidino, morpholino, piperazino or N-($C_1-C_4$-alkyl)piperazino,
$An^\ominus$ is one equivalent of an anion and
m and n are identical or different and each is independently of the other 0 or 1.
2. A basic rhodamine dye as claimed in claim 1, wherein L is $C_2-C_4$-alkylene and $R^1$, $R^2$ and $R^3$ are each $C_1-C_4$-alkyl.
3. A recording fluid for the ink jet process, containing a water-miscible solvent and a basic rhodamine dye as claimed in claim 1.
4. A method of using a basic rhodamine dye as claimed in claim 1 for coloring paper stock.

* * * * *